(No Model.) 2 Sheets—Sheet 1.

J. U. TEETOR.
GRAIN MEASURING, REGISTERING, AND SACKING MACHINE.

No. 515,177. Patented Feb. 20, 1894.

Witnesses:
C. C. Hibbs
Jos. M. Teetor

Inventor:
Jacob U. Teetor
By his Atty
Abr. L. Teetor

THE NATIONAL LITHOGRAPHING COMPANY,
WASHINGTON, D. C.

(No Model.) 2 Sheets—Sheet 2.
J. U. TEETOR.
GRAIN MEASURING, REGISTERING, AND SACKING MACHINE.
No. 515,177. Patented Feb. 20, 1894.
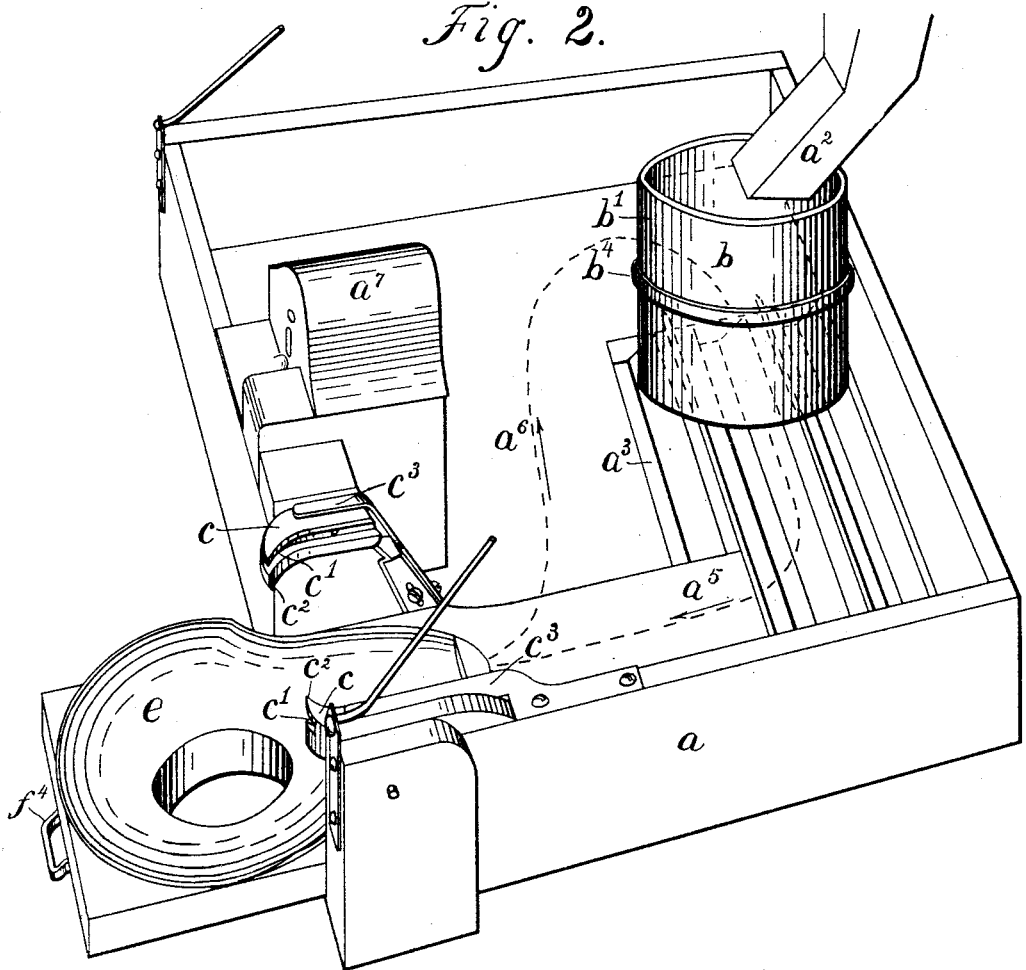
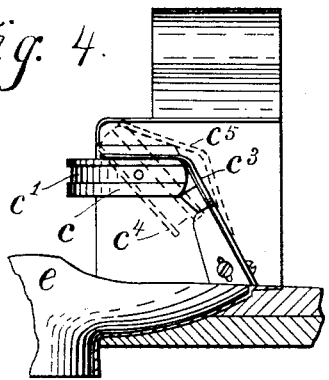
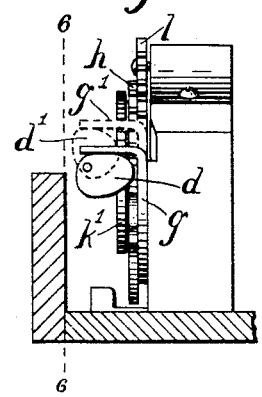

UNITED STATES PATENT OFFICE.

JACOB U. TEETOR, OF HAGERSTOWN, INDIANA.

GRAIN MEASURING, REGISTERING, AND SACKING MACHINE.

SPECIFICATION forming part of Letters Patent No. 515,177, dated February 20, 1894.

Application filed May 12, 1893. Serial No. 474,003. (No model.)

*To all whom it may concern:*

Be it known that I, JACOB U. TEETOR, a citizen of the United States, and a resident of Hagerstown, in the county of Wayne and State of Indiana, have invented certain new and useful Improvements in Grain Measuring, Registering, and Sacking Machines; and I declare hereby that the following is a full, clear, and exact description of the invention, such as will enable others skilled in the art to which it appertains to make and use the same.

My invention relates to an improvement in grain measuring, registering and sacking machines adaptable either to use in elevators or in connection with thrashing machines. The object being to use the ordinary half-bushel measure with slight alterations in connection with registering mechanism; another object being to produce facilities for sacking grain as measured and registered.

With these objects in view the invention consists in certain novel features of construction, combinations and arrangements of parts as will be hereinafter set forth and pointed out in the claims.

Figure 1:
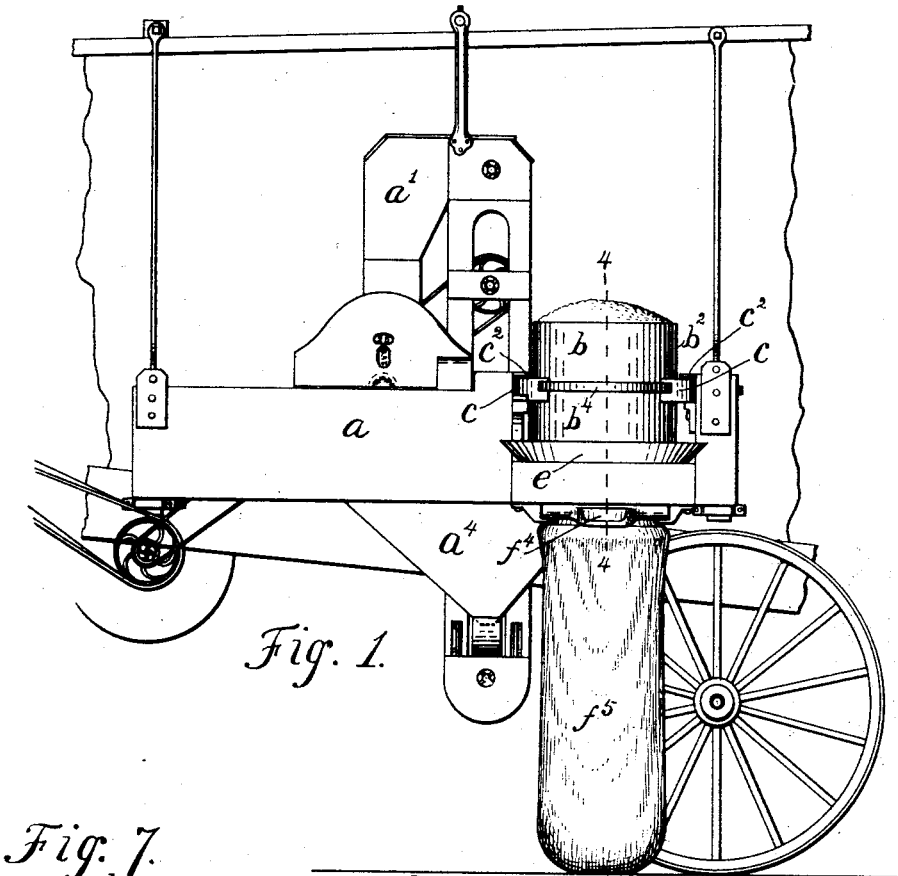
Figure 7:
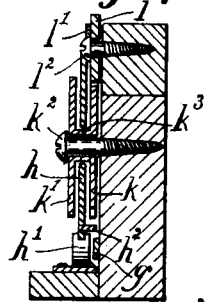
Figure 6:
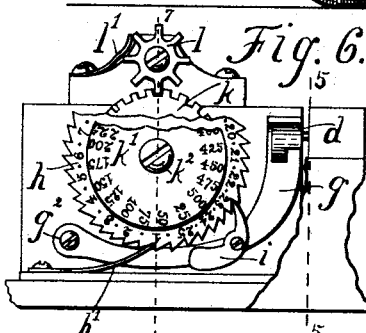
Figure 8:
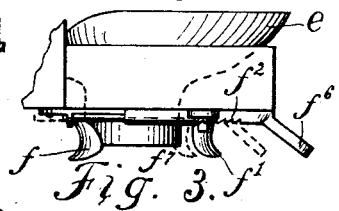
Figure 9:
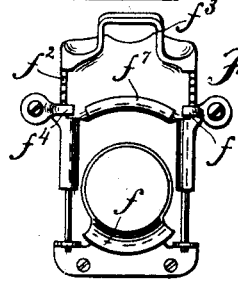
Figure 3:
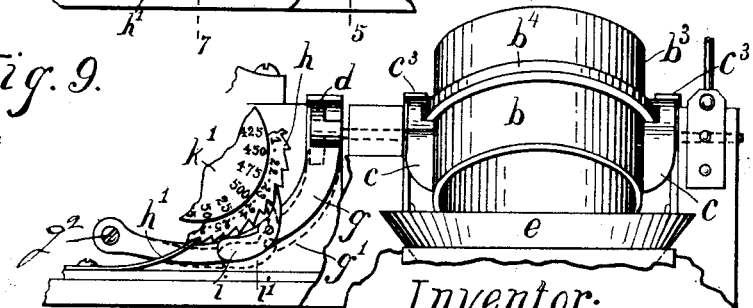

In the accompanying drawings: Figure 1 is a front view of my device as applied to an ordinary thrasher and separator preferably attached so as to be easily removable and held by hooks and brace rods while in use. Fig. 2 is a perspective view of same. Fig. 3 is a detached vertical sectional front view of the mechanism operating the register. Fig. 4 is a detached vertical sectional side view through line 4, Fig. 1, having the measure removed. Fig. 5 is a detached vertical sectional side view on line 5 Fig. 6. Fig. 6. is a detached vertical sectional front view on line 6 Fig. 5. Fig. 7 is a detached vertical sectional side view on line 7 of register Fig. 6. Fig. 8 is a detached side view of sacker. Fig. 9 is a detached bottom view of the sacker.

$a$. is the main body or frame of my device the grain to be measured being carried by an elevator $a'$, which receives the grain at its lower extremity from the thrasher and delivers it through spout, $a^2$, into the measure $b$, which is preferably a half-bushel measure, there being two necessary; one to take the place of the other in the operation as in ordinary hand measuring, provision here being made by openings $a^3$ through the bottom of body $a$ for the passage of all overflow falling into the hopper $a^4$ by which it is conducted back into elevator and returned to measure.

Measure $b$ is provided about mid-way of its height with an annular tilting flange $b^4$, which in cross section is preferably about square, and sufficiently strong enough to practically support the weight of the measure filled with grain. When the measure is filled at position $b'$ it is slid along course $a^5$ into position $b^2$ when said annular tilting flange $b^4$ will engage with the grooves $c'$ in tilting blocks $c$ which are centrally mounted on axle-pins; said tilting blocks are curved lengthwise, contracting parallel with grooves $c'$, approaching toward each other at outer ends, $c^2$, so that the measure $b$ may be slid into them until it casts up against the inwardly projecting ends $c^2$ so that it rests preferably at or nearly centrally with the axle-pins so that it may be easily turned over as shown at position $b^3$ emptying the contents of the measure into hopper $e$ of sacker, the position of tilting block being as seen at $c^4$, Fig. 4, thence the measure is turned back again and slid over course $a^6$, returned again to position $b'$, when the measure being filled while the former was being emptied follows through the same course and operations. These said contracting tilting blocks are held in line and proper position when not in operation by spring plates, $c^3$. One of said tilting blocks, in this case the inner one has mounted upon the opposite end of its axle-pin an eccentric $d$ which engages with and operates an arm $g$ which is pivoted at $g^2$ and has pivoted to it at or about midway of its length, a gravity pawl $i$ engaging with the teeth of a register dial plate $h$. Thus when a measure is emptied eccentric $d$ is turned to position $d'$, arm $g$ brought to position $g'$ and pawl $i$ to position $i'$ and dial $h$ advanced one point at each such movement registering one-half bushel and is held by stop $h'$.

This toothed dial plate $h$ is graduated in this case into fifty divisions representing so many half bushels or twenty-five bushels for each complete revolution; and is provided at one point with a pin $h^2$ adapted to engage at each revolution with a sprocket $l$ which engages with the teeth of disk $k$ which latter is secured by means of a hub section $k^3$ to dial plate $k'$ and pivoted on pin or screw $k^2$; the latter said dial plate being in this case graduated to register quantities increasing by twenty-five representing twenty-five bushels for each division, there being as many teeth. The dial plate $h$ is movably mounted on hub $k^3$ so as to be operated easily. The sprocket $l$ is after each movement stopped in position and held by spring stop $l'$.

Below hopper $e$ is a fixed flange section $f$ of part of a circle and opposite to it a similar but movable section $f'$ which is provided with ratchet toothed sections $f^2$ extending into a handle $f^6$ and are adapted to engage with and rest upon catches $f^4$; the weight of the sack $f^5$, being partially upon said catches, thus in removing a filled sack and replacing an empty one when the movable flange $f'$ is lifted by handle $f^6$ it may be moved back to position $f^7$ when sacks will be easily changed and when an empty sack is replaced and handle drawn out and allowed to rest on catches $f^4$ the sack will be held firmly.

Having described my invention, what I claim as new, and desire to secure by Letters Patent, is—

1. In a grain measurer and register the combination of a measure, a flange on said measure to engage with tilting blocks, and said tilting blocks as set forth.

2. In a grain measurer and register the combination embracing a measure, a flange on said measure to engage with tilting blocks, contracting tilting blocks, and grooves in said tilting blocks conforming therewith to engage with said flange, all as set forth.

3. In a grain measurer and register, a measure, a tilting or suspension flange on said measure, contracting tilting blocks, grooves in said blocks conforming to and contracting with said blocks, and springs to retain said blocks in horizontal position, all combined to operate as described.

4. The combination of a measure, contracting grooved tilting blocks, springs to retain said blocks in a horizontal position, an axle in one of said blocks secured to and turning therewith, an eccentric on opposite end of said axle, an arm movably fixed at one end and projecting over and resting on said eccentric at other end and a pawl secured to said arm at an intermediate point to engage with a toothed registering dial, all operating substantially as set forth.

5. The combination embracing a measure, a suspension flange on same, contracting suspending tilting blocks, parallel grooves in said blocks contracting therewith adapted to receive and support said measure by said flange, an eccentric rocking with said blocks, an arm operated by said eccentric, a pawl carried by said arm, and a toothed registering dial operated by said pawl as set forth.

6. In a measuring and registering machine the combination of a rocking eccentric, an arm engaging with said eccentric, a gravity pawl pivoted on said arm, a saw-toothed revolving dial plate operated by said pawl, an operating pin projecting from rear side of said dial and secured to it near the periphery, a long toothed sprocket journaled beyond farthest reach of said pin adapted to be operated by said pin engaging with said long teeth at a suitable point within their outer extremity, a spring having a suitable bend near its extremity adapted to rest between teeth of said sprocket, a disk having equally distant recesses at periphery or teeth of suitable shape to be engaged by ends of teeth of said sprocket, a hub on said disk upon which is loosely mounted said saw-toothed dial and another smaller dial secured to front end of said hub so as to move with said disk all as set forth.

7. In a grain register a rotating dial provided with teeth and preferably graduated into fifty divisions and having as many teeth, a pawl operating said dial, a pin projecting rearwardly from said dial, a sprocket adapted to be operated by said pin, a spring stop adapted to retain said sprocket in proper position, a disk adapted to be operated by extreme ends of teeth of said sprocket, and a smaller dial fixed to hub of said disk and rotating therewith and being preferably provided with as many teeth as there are divisions, all combined to operate substantially as set forth.

8. In a grain measurer and sacker the combination of a measure suspended by tilting blocks, a hopper located beneath said tilting blocks, a fixed section of a circular flange secured to under side of said hopper, a movable similar section of circular flange extending with its rim in an opposite direction from the fixed section, bars extending from sides of said movable flange forming a handle by which to operate it, a ratchet-toothed section secured to or formed on parallel sides of said handle bars and sharp-edged rests adapted to support said toothed arms of handle by engaging with said teeth, all combined to operate as and for the purposes set forth.

JACOB U. TEETOR.

Witnesses:
WM. STONEBRAKER,
JOHN B. STONEBRAKER.